United States Patent [19]

Yang et al.

[11] Patent Number: 5,610,205
[45] Date of Patent: Mar. 11, 1997

[54] PROCESS FOR MAKING A POLYETHERESTER BY INSERTION OF A CARBOXYLIC ACID INTO A POLYETHER

[75] Inventors: Lau S. Yang, Wilmington, Del.; Jeffrey A. Klang, Exton, Pa.

[73] Assignee: ARCO Chemical Technology, L.P., Greenville, Del.

[21] Appl. No.: 644,997

[22] Filed: May 14, 1996

Related U.S. Application Data

[62] Division of Ser. No. 419,323, Apr. 10, 1995, Pat. No. 5,569,737, which is a division of Ser. No. 228,845, Apr. 18, 1994, Pat. No. 5,436,314.

[51] Int. Cl.$^6$ .................................. C08F 2/46; C08J 3/28
[52] U.S. Cl. .................... 522/102; 528/272; 528/274; 528/275; 528/280; 528/281; 528/282; 528/283; 528/286; 528/306; 528/307; 524/711; 524/773; 524/777; 524/783; 524/784; 524/785; 524/786; 524/845; 525/445; 522/1
[58] Field of Search ................................ 528/272, 274, 528/275, 280, 281, 282, 283, 286, 306, 307; 524/711, 773, 777, 783, 784, 785, 786, 845; 525/445; 522/1, 102

[56] References Cited

U.S. PATENT DOCUMENTS

| 5,254,723 | 10/1993 | Yang et al. | 560/240 |
| 5,319,006 | 6/1994 | Yang et al. | 523/500 |

OTHER PUBLICATIONS

Burwell, Jr., "The Cleavage of Ethers," *Chem. Rev.*(1954) 615.

*Primary Examiner*—Samuel A. Acquah
*Attorney, Agent, or Firm*—Jonathan L. Schuchardt

[57] ABSTRACT

A process for making polyetheresters is disclosed. A polyether is reacted with a carboxylic acid in the presence of a strong protic acid or a metal salt of a strong protic acid to promote insertion of the carboxylic acid into polyether carbon-oxygen bonds to produce a polyetherester. The polyetheresters are useful for various applications in the polyurethane and unsaturated polyester industries.

4 Claims, No Drawings

PROCESS FOR MAKING A POLYETHERESTER BY INSERTION OF A CARBOXYLIC ACID INTO A POLYETHER

This is a division of application Ser. No. 08/419,323, filed Apr. 10, 1995 now U.S. Pat. No. 5,569,737, which is a division of application Ser. No. 08/228,845, filed Apr. 18, 1994, now U.S. Pat. No. 5,436,314.

FIELD OF THE INVENTION

The invention relates to a process for making polyetheresters. In particular, the invention is a process for preparing polyetheresters from polyethers by randomly inserting a carboxylic acid, especially a dicarboxylic acid, into the polyether backbone. Polyetheresters are useful for a wide variety of applications, particularly in the unsaturated polyester and polyurethane industries.

BACKGROUND OF THE INVENTION

Recently, we reported the discovery of a new reaction in which a cyclic anhydride randomly inserts into carbon-oxygen bonds of a polyether to generate a polymeric composition having both ether and ester functionalities (see appl. Ser. No. 07/979,760, now U.S. Pat. No. 5,319,006). A Lewis acid such as zinc chloride or zinc bromide catalyzes the reaction.

When a polyether polyol reacts with a cyclic, saturated anhydride, for example, the product is a saturated polyetherester polyol useful for polyurethane applications. Cyclic, unsaturated anhydrides such as maleic anhydride can be used in the process to make unsaturated polyetherester resins. The unsaturated resins can be reacted with vinyl monomers to produce cured polyetherester products.

Compared with the synthesis of conventional unsaturated polyester resins, the process for making polyetheresters by insertion of an anhydride has great flexibility. The average polyether chain length between ester linkages and the crosslinkability of the polyetherester are controlled by simply adjusting the proportion of cyclic, unsaturated anhydride used. Products having a wide range of unsaturation levels are available from a single polyether polyol and a single cyclic, unsaturated anhydride.

We also applied the Lewis acid-catalyzed insertion process to the reaction of polyethers and acyclic anhydrides to make glycol diesters (U.S. Pat. No. 5,254,723). Using this process, a relatively crude polyether polyol mixture can be converted with acetic anhydride to a mixture of glycol diacetates. The glycol diacetates are easily purified by distillation, and can be used as solvents or chemical intermediates.

The Lewis acid-catalyzed process for anhydride insertion has some drawbacks. For example, the activity of the catalysts is somewhat lower than desirable. Typically, at least about 1 wt. % of the Lewis acid catalyst is needed for good activity in making the polyetherester. Second, the polyetherester products often have a higher degree of color than is desirable. Third, the presence of high levels of residual Lewis acid catalysts in the polyetherester product can have an unfavorable impact on performance in various end uses. Fourth, a significant amount of volatile by-products are generated in making the polyetheresters. In addition, Lewis acids are often not satisfactory for use in manufacturing operations because they tend to attack reactors and other processing equipment.

A key limitation of the Lewis acid-catalyzed insertion process for making polyetheresters is that the reaction does not appear to work for carboxylic acids. As a practical matter, the cost and availability of various cyclic anhydrides limit the kinds of polyetherester products that can be made.

Because of the wide range of available dicarboxylic acids, and the relatively low cost of most dicarboxylic acids relative to the corresponding anhydrides, a process that would enable insertion of dicarboxylic acids into polyethers to give polyetheresters would be valuable. A preferred process could use aliphatic and aromatic dicarboxylic acids commonly used for making polyester resins, such as isophthalic acid, adipic acid, and the like. A preferred process would avoid some of the other disadvantages of the Lewis acid-catalyzed process for making polyetheresters by anhydride insertion, such as the generation of volatile by-products. Ideally, the process would give low-color polyetheresters useful for a variety of products, including unsaturated polyesters and polyurethanes.

SUMMARY OF THE INVENTION

The invention is a process for making polyetheresters from polyethers. The process comprises reacting a polyether with a carboxylic acid in the presence of a strong protic acid or a metal salt of a strong protic acid in an amount effective to promote insertion of the carboxylic acid into carbon-oxygen bonds of the polyether to produce the polyetherester. Protic acids useful in the invention have a pKa less than about 0. The metal salts are derived from these protic acids.

We surprisingly found that insertion of carboxylic acids into polyethers to give polyetheresters, which apparently does not occur with Lewis acids, proceeds smoothly in the presence of a strong protic acid (pKa less than about 0) or a metal salt of a strong protic acid. The process of the invention avoids some of the problems of the Lewis acid-catalyzed anhydride-insertion process. Low catalyst levels suffice, ordinary reactors and equipment can be used, generation of volatile by-products is minimized, and low-color, high-quality polyetheresters result.

A wide variety of aliphatic and aromatic carboxylic acids can be used in the process of the invention. The ability to insert carboxylic acids, especially dicarboxylic acids, into a polyether enables the preparation of a broad array of polyetheresters, and greatly expands the utility of the insertion reaction. Because the reaction works with simple, readily available dicarboxylic acids such as isophthalic acid and adipic acid, the process of the invention is an economical, general route to polyetheresters. Polyetheresters made by the process of the invention are useful in a variety of applications, particularly in the unsaturated polyester and polyurethane industries.

DETAILED DESCRIPTION OF THE INVENTION

In the process of the invention, a polyether reacts with a carboxylic acid in the presence of a strong protic acid or a metal salt of a strong protic acid in an amount effective to promote insertion of the carboxylic acid into carbon-oxygen bonds of the polyether to produce a polyetherester.

Polyethers suitable for use in the invention are those derived from base or acid-catalyzed ring-opening polymerization of cyclic ethers such as epoxides, oxetanes, oxolanes, and the like. The polyethers have repeat units of oxyalkylene groups (—O—A—) in which A has from 2 to 10 carbon atoms, preferably from 2 to 4 carbon atoms. The polyethers can have different end groups, depending upon how the polyethers are made or modified. For example, the polyether can have hydroxyl, ester, ether, acid, olefinic, or amino end groups, or the like, or combinations of these. Mixtures of different types of polyethers can be used.

Preferred polyethers for the process of the invention am polyether polyols. Suitable polyether polyols include, for example, polyoxypropylene polyols, polyoxyethylene polyols, ethylene oxide-propylene oxide copolymers, polytetramethylene ether glycols, oxetane polyols, and copolymers of tetrahydrofuran and epoxides. Typically, these polyols will have average hydroxyl functionalities from about 2 to about 8, and number average molecular weights from about 250 to about 25,000. The polyether polyols can be recycled polyols derived from a polyurethane foam, elastomer, sealant, or the like.

A carboxylic acid is used in the process of the invention. Useful carboxylic acids include mono-, di-, and polycarboxylic acids. The carboxylic acid can be saturated or unsaturated. Dicarboxylic acids are generally preferred. Particularly preferred are linear, branched, and cyclic $C_3$-$C_{40}$ aliphatic dicarboxylic acids and $C_8$-$C_{40}$ aromatic dicarboxylic acids.

Suitable carboxylic acids for use in the invention include, for example, acetic acid, propionic acid, decanoic acid, benzoic acid, steadc acid, linoleic acid, oleic acid, adipic acid, suberic acid, malonic acid, succinic acid, glutaric acid, pimelic acid, itaconic acid, suberic acid, azelaic acid, sebacic acid, maleic acid, fumaric acid, citraconic acid, phthalic acid, isophthalic acid, terephthalic acid, dimer acids, tetrahydrophthalic acid, halogenated phthalic and tetrahydrophthalic acids, and the like. Preferred carboxylic acids are adipic acid, maleic acid, fumaric acid, phthalic acid, and isophthalic acid.

In one embodiment of the invention, the carboxylic acid is generated in situ by using, instead of the carboxylic acid, an anhydride and at least about one molar equivalent of water. For example, maleic anhydride, water, catalyst, and polyol can be combined and heated at a relatively mild temperature that is effective to cause hydrolysis of the anhydride (40°–60° C.) to produce maleic acid. The reaction temperature of the mixture is then elevated to promote insertion of the diacid into the polyether to generate a polyetherester product. See Example 4 below.

A strong protic acid catalyzes the process of the invention. Suitable protic acids are inorganic and organic protic acids that have a pKa less than about 0. Generally, the acids will be stronger than organic carboxylic acids. Suitable acids include arylsulfonic acids, alkylsulfonic acids, and halogenated alkyl- and arylsulfonic acids. Also suitable are hydrogen halides, halosulfonic acids, tetrafluoroboric acid, heteropolyacids, and sulfuric acid. Mixtures of different acids can be used. Examples of suitable acids include, but are not limited to, p-toluenesulfonic acid, trifluoromethanesulfonic acid (triflic acid), trichioromethanesulfonic acid, hydrochloric acid, hydrobromic acid, hydriodic acid, tetrafluoroboric acid, sulfuric acid, phosphotungstic acid, phosphomolybdic acid, and the like. Preferred protic acids are sulfuric acid, p-toluenesulfonic acid, and phosphotungstic acid.

The protic acid is used in an amount effective to promote random insertion of the carboxylic acid into polyether carbon-oxygen bonds and produce a polyetherester. The preferred amount to be used depends on many factors, including the desired reaction rate, the type of polyether and carboxylic acid used, catalyst type, reaction temperature, and other considerations. If the catalyst is omitted, carboxylic acid insertion does not occur; with too little catalyst, the insertion reaction is slower than desirable. Generally, it is preferred to use an amount of protic acid within the range of about 0.01 to about 1 weight percent based on the amount of polyether used. A more preferred range is from about 0.05 to about 0.5 weight percent.

We also found that metal salts of strong protic acids are effective catalysts for the process of the invention. The metal salts are derived from protic acids that have a pKa less than about 0. Thus, the salts useful in the invention are generally derived from the protic acids described above as suitable for use in the process. Mixtures of strong protic acids and metal salts of the acids can be used.

Preferred metal salts useful as catalysts for the process of the invention are metal salts of arylsulfonic acids, aikyisulfonic acids, halogenated aryl- and alkylsulfonic acids, tetrafluoroboric acid, sulfuric acid, heteropolyacids, and halosuifonic acids. Sulfonic acid salts, especially triflate salts, are particularly preferred.

Preferred metal salts include metal salts of strong protic acids (pKa less than about 0) in which the metal is selected from Group IA, Group IIA, Group IIB, Group IB, Group IIIA, Group IVA, Group VA, and Group VIII. Thus, the metal can be, for example, lithium, potassium, magnesium, zinc, copper, aluminum, tin, antimony, iron, nickel.

Suitable metal salts include, but are not limited to, lithium triflate, sodium triflate, magnesium triflate, zinc triflate, copper(II) triflate, zinc tetrafluoroborate, zinc p-toluenesulfonate, aluminum triflate, silver tetrafluoroborate, iron(II) tetrafluoroborate, nickel(II) tetrafluoroborate, tin(II) triflate, and the like. Mixtures of metal salts can be used.

The metal salt is used in an amount effective to promote random insertion of the carboxylic acid into polyether carbon-oxygen bonds and produce a polyetherester. As with the protic acid catalysts, the preferred amount to be used depends on many factors, including the desired reaction rate, the type of polyether and carboxylic acid used, catalyst type, reaction temperature, and other factors. Generally, it is preferred to use an amount of metal salt within the range of about 1 part per million ($10^{-4}$ wt. %) to about 1 weight percent based on the amount of polyether used. A more preferred range is from about 10 parts per million to about 0.5 weight percent.

An anhydride is optionally included in the process of the invention. The anhydride can be cyclic or acyclic, saturated or unsaturated. In a "cyclic" anhydride, the anhydride functionality is contained within a ring, such as in phthalic anhyddde and maleic anhyddde. "Acyclic" anhyddes, which include acetic anhydride, propionic anhydride, and the like, have no such ring. "Saturated" anhydrides contain no ethylenic unsaturation, although they may contain aromatic rings. Phthalic anhydride, propionic anhydride, and succinic anhydride are examples of saturated anhydrides. "Unsaturated" anhydrides contain ethylenic unsaturation. This unsaturation becomes incorporated into the polyetherester, and can be used for crosslinking. Examples include maleic anhydride, itaconic anhydride, and the like.

Specific examples of suitable anhydrides for use in the invention include, but are not limited to, acetic anhydride, propionic anhydride, maleic anhydride, phthalic anhydride, succinic anhydride, tetrahydrophthalic anhydride, citraconic anhydride, itaconic anhyddde, and aryl-, alkyl- and halogen-substituted derivatives of these. Mixtures of anhdddes can be used. Where unsaturated polyetheresters are desired, maleic anhydride or mixtures of maleic anhydride and phthalic anhydride are particularly preferred.

The process of the invention is conveniently performed by combining the polyether, carboxylic acid, and catalyst in any desired order or manner, and heating the mixture at the desired reaction temperature under conditions effective to promote carboxylic acid insertion to produce a polyetherester. The progress of the reaction can be followed by measuring the acid number, which will decrease and level off as the reaction proceeds. The process can be performed batchwise, semi-batchwise, or continuously as desired.

Polyetherester products obtained from the process of the invention commonly have a large proportion of carboxylic acid end groups. It is generally preferred to heat the polyetherester product with a glycol such a propylene glycol, ethylene glycol, dipropylene glycol, or the like, to esterify these acid groups with the glycol. The resulting polyetheresters have hydroxyl end groups and lower acid numbers. Compositions with low acid numbers are often needed for use in certain applications, such as, for example, formulation into polyurethane sealants and elastomers.

The amount of glycol used is preferably at least about 1 equivalent of glycol for each residual carboxylic acid end group. Typically, this amounts to heating the polyetherester with at least about 5–10 wt. % of the glycol. The glycol is typically heated with the polyetherester at about the same temperature as that used for the insertion reaction until the acid number of the mixture drops to the desired level. Any excess glycol is removed by stripping. A thermosettable unsaturated polyetherester resin might be made, for example, by reacting a polyether polyoi and 30 wt. % maleic acid to give a polyetherester product having an acid number in the 100 to 200 mg KOH/g range, then heating the product with 10 wt. % propylene glycol to produce a new polyetherester having an acid number within the range of about 30 to about 80 mg KOH/g.

Any convenient reaction temperature can be chosen for making polyetheresters by the process of the invention provided that the temperature is sufficient to promote insertion of the carboxylic acid into the polyether. Generally, however the reaction is too slow to be practical at temperatures below about 60° C. Preferably, the process is performed at a temperature within the range of about 80° C. to about 250° C. A more preferred range is from about 100° C. to about 220° C.; most preferred is the range from about 150° C. to about 200° C.

It is preferred, although not necessary, to perform the process under an inert atmosphere of nitrogen, argon, or the like. Preferably, the reaction mixture is well agitated during the carboxylic acid-insertion process. Reactions are typically complete within 5–12 h.

The catalyst is optionally removed from the polyetherester product before using it in a polyurethane or polyester application. Catalyst removal, although not usually required, may be desirable for certain end-uses that are particularly sensitive to the presence of residual acids or salts. Any suitable method generally known in the art for removing acids or salts from polyethers and polyester resins can be used. Salts can often be removed by ordinary filtration or adsorption. Acidic catalysts can be removed, for example, using a basic ion-exchange resin, water washing, adsorption onto basic alumina or magnesium silicate, or by converting the acid to a salt and filtering to remove the salt.

The process of the invention offers significant advantages over earlier processes for making polyetheresters, particularly the Lewis acid-catalyzed anhydride-insertion process. The ability to use dicarboxylic acids is valuable because the corresponding anhydrides are often not available or, if available, are more costly than the dicarboxylic acids. Because dicarboxylic acids can be used, the invention enables the preparation of a broad spectrum of polyetheresters, and greatly expands the utility of the insertion reaction for making polyetheresters.

The process avoids some drawbacks of Lewis acid-catalyzed anhydride insertions. Volatile by-products generated in that process, including minor amounts of aldehydes and cyclic ethers, are minimized or are not generated in the process of the invention. In addition, the process of the invention gives polyetheresters that are low in color, often an important asset for polymers intended for use in coatings or sealants.

A wide variety of polyetherester products can be made, depending on the type of carboxylic acid(s) used, the relative proportion of unsaturated to saturated carboxylic acid, the relative proportion of carboxylic acid to polyether, the nature and molecular weight of the polyether component, the relative amount of any anhydride optionally used, and other factors.

An unsaturated polyetherester resin can be made by reacting the polyether with at least some proportion of an unsaturated carboxylic acid, preferably an unsaturated dicarboxylic acid, or by including a cyclic, unsaturated anhydride such as maleic anhydride in the process. The unsaturated polyetherester resin can be used like conventional unsaturated polyester resins. For example, the polyetherester resin can be combined with a vinyl monomer such as styrene, and heated in the presence of a free-radical initiator to produce a cured polyetherester product.

Saturated and unsaturated polyetheresters made by the process of the invention from polyethers and di- or poly-carboxylic acids will be useful, for example, in polyurethane foams, elastomers, sealants, or adhesives, as replacements for polyether or polyester polyols.

Polyetherester products derived from reaction of a polyether and a monocarboxylic acid will generally have different uses. Polyethers having one or more ester end groups will generally result from reaction of polyethers with mono-carboxylic acids. The products will have lower molecular weights than the starting polyether because chain scission results from insertion of a mono-carboxylic acid. Because the insertion occurs at random places in the polyether chain, the products will also have broad molecular weight distributions. These products should have utility in such specialized applications as functional fluids and drilling muds, as well as in vadous polyurethane and unsaturated polyester applications. The process of the invention can be tailored to give products having the desired functionalities and properties.

The following examples merely illustrate the invention. Those skilled in the art will recognize many variations that are within the spidt of the invention and scope of the claims.

EXAMPLE 1. PreDaration of a Polyetherester from Polypropylene Glycol and Adipic Acid using p-Toluenesulfonic Acid as a Catalyst A one-liter reaction kettle is charged with a polypropylene glycol (about 2000 mol. wt., 500 g), adipic acid (125 g), and p-toluenesulfonic acid (6.25 g). The mixture is heated to 185° C. After 4 h, the acid number drops to 40 mg KOH/g. Propylene glycol (294 g) is added, and heating continues for another 4 h until the acid number is less than 2. Excess propylene glycol is removed by stripping, and a light yellow polyetherester product (607 g) is obtained. GPC results: Mn=1975; Mw/Mn=1.65.

EXAMPLE 2. Preparation of a Polyetherester from Polypropylene Glycol and Isophthalic Acid using p-Toluenesulfonic Acid as a Catalyst Isophthalic acid (64 g), polypropylene glycol (about 2000 mol. wt., 255 g), and p-toluenesulfonic acid (3.2 g) are heated for 11 h at 185° C. to produce a mixture that has an acid number of 50 mg KOH/g. Propylene glycol (158 g) is added, and heating continues for another 3 h to lower the acid number to less than 2. Excess propylene glycol is removed by stripping, and a yellow polyetherester product (315 g) is obtained.

EXAMPLE 3. Preparation of a Polyetherester from Polypropylene Glycol and Adipic Acid using Zinc Triflate as a Catalyst The method of Example 1 is followed, but zinc triflate (0.31 g) is used instead of p-toluenesulfonic acid as a catalyst. After heating for 5.5 h at 185° C., the acid number is 51 mg KOH/g. Propylene glycol (300 g) is added, and heating continues for 10 h to lower the acid number to less than 2. Excess propylene glycol is stripped to give 530 g of light yellow polyetherester product.

EXAMPLE 4. Preparation of a Polyetherester from Polypropylene Glycol and Maleic Acid using D-Toluenesulfonic Acid as a Catalyst

In-situ Generation of Maleic Acid from Maleic Anhydride and Water

A two-liter resin kettle equipped with a mechanical stirrer, nitrogen sparge tube, thermocouple, and distillation head is charged with a polyether triol (3000 mol. wt., all-PO triol, 975 g), maleic anhydride (525 g), and p-toluenesulfonic acid (1.5 g). The mixture is heated to about 55° C. until a homogeneous solution results. Water (152 g) is then added, and the mixture is stirred until the exotherm from the hydrolysis reaction of maleic anhydride and water dissipates. The temperature of the mixture is then gradually increased to 185° C. and is held at that temperature until the acid number drops to 138 mg KOH/g. Propylene glycol (243 g) is added, and heating continues until the acid number falls to 53. After vacuum stripping, a clear, nearly water-white resin results.

The resin is blended with styrene (60 wt. % resin). In the SPI 180° F. gel time test (Society of the Plastics Industry, Resin Technical Committee Test Procedure, published 1986), the resin shows a peak exotherm of 425° F. at 5 minutes, 40 seconds. The resin can be cured with cobalt naphthenate and methyl ethyl ketone peroxide or a mixture of benzoyl peroxide and tert-butyl perbenzoate to produce a clear, hard plastic article.

EXAMPLE 5. Preparation of a Polyetherester by Insertion of Isophthalic Acid and Maleic Anhydride A one-liter resin kettle is charged with the same polyether triol used in Example 4 (400 g), isophthalic acid (133 g), and p-toluenesulfonic acid (6.7 g). The mixture is heated to 185° C. for 12 h to lower the acid number to 100 mg KOH/g. Maleic anhydride (133 g) is then added, and heating continues for 4 h, after which the acid number is 113. Propylene glycol (52 g) is added, and the mixture is heated to 185° C. to reduce the acid number to 66. The mixture is vacuum stripped to give a clear, yellow resin. The resin can be blended with styrene and cured as previously described to give a clear, hard plastic article.

EXAMPLE 6. Preparation of a Low-Viscosity Polyether Diester Fluid from a Polyether Polyol and Coconut Fatty Acid A one-liter reactor is charged with 300 g of a polyoxypropylene triol (3000 mol. wt., viscosity=500 cps), 350 g of coconut fatty acid (a mixture of monocarboxylic acids, ave. mol. wt.=214), and 8.6 g of p-toluenesulfonic acid. The mixture is heated at 195° C. for 14 h until the acid number is 12 mg KOH/g. Dipropylene glycol (15 g) is added, and the mixture is heated for another hour to give 650 g of a polyetherester product. The product is diluted with toluene, and is washed with aqueous sodium bicarbonate solution. Toluene is removed under vacuum to give a liquid product having an acid number <2 mg KOH/g, and an average mol. wt. of about 800. The average polyether chain has about 7 oxypropylene units. The viscosity of the product is about 33 cps at room temperature, and about 17 cps at 40° C.

The preceding examples are meant as illustrations. The following claims define the scope of the invention.

We claim:

1. A process for making a cured polyetherester product, said process comprising:
   (a) reacting polyether with an unsaturated dicarboxylic acid in the presence of a protic acid having a pKa less than about 0 in an amount effective to promote random insertion of the dicarboxylic acid into polyether carbon-oxygen bonds and produce an unsaturated polyetherester resin;
   (b) combining the unsaturated polyetherester resin with a vinyl monomer and a free-radical initiator; and
   (c) heating the mixture at a temperature effective to produce the cured polyetherester product.

2. A process for making a cured polyetherester product, said process comprising:
   (a) reacting a polyether with an unsaturated dicarboxylic acid in the presence of a metal salt of a protic acid, wherein the protic acid has a pKa less than about 0, in an amount effective to promote random insertion of the dicarboxylic acid into polyether carbon-oxygen bonds and produce an unsaturated polyetherester resin;
   (b) combining the unsaturated polyetherester resin with a vinyl monomer and a free-radical initiator; and
   (c) heating the mixture at a temperature effective to produce the cured polyetherester product.

3. A cured polyetherester product made by the process of claim 1.

4. A cured polyetherester product made by the process of claim 2.

* * * * *